United States Patent
Abdi Taghi Abad et al.

(10) Patent No.: US 11,769,078 B2
(45) Date of Patent: Sep. 26, 2023

(54) SYSTEMS AND METHODS FOR TRANSFER LEARNING OF NEURAL NETWORKS

(71) Applicant: Capital One Services, LLC, McLean, VA (US)

(72) Inventors: Fardin Abdi Taghi Abad, Seattle, WA (US); Jeremy Goodsitt, Champaign, IL (US); Austin Walters, Savoy, IL (US)

(73) Assignee: Capital One Services, LLC, McLean, VA (US)

( * ) Notice: Subject to any disclaimer, the term of this patent is extended or adjusted under 35 U.S.C. 154(b) by 97 days.

(21) Appl. No.: 17/446,719

(22) Filed: Sep. 2, 2021

(65) Prior Publication Data

US 2021/0397882 A1    Dec. 23, 2021

Related U.S. Application Data

(63) Continuation of application No. 16/737,058, filed on Jan. 8, 2020, now Pat. No. 11,132,583, which is a
(Continued)

(51) Int. Cl.
| | |
|---|---|
| *G06N 3/08* | (2023.01) |
| *G06N 3/04* | (2023.01) |
| *G06N 5/00* | (2023.01) |
| *G06N 20/00* | (2019.01) |
| *G06N 3/082* | (2023.01) |
| *G06F 18/22* | (2023.01) |

(Continued)

(52) U.S. Cl.
CPC ............. *G06N 20/00* (2019.01); *G06F 18/22* (2023.01); *G06F 18/23213* (2023.01); *G06F 18/24* (2023.01); *G06N 3/082* (2013.01)

(58) Field of Classification Search
CPC ........ G06N 20/00; G06N 3/082; G06F 18/22; G06F 18/24; G06F 18/23213
See application file for complete search history.

(56) References Cited

U.S. PATENT DOCUMENTS

| | | |
|---|---|---|
| 6,714,918 B2 | 3/2004 | Hillmer |
| 9,336,484 B1 * | 5/2016 | Iverson ............... G06F 18/2433 |

(Continued)

OTHER PUBLICATIONS

Srivastava, Nitish, et al., "Dropout: A simple way to prevent neural networks from overfitting," Journal of Machine Learning Research 15.1 (2014): 1929-1958 (30 pages).

(Continued)

*Primary Examiner* — Brandon S Cole
(74) *Attorney, Agent, or Firm* — Bookoff McAndrews, PLLC (57) ABSTRACT

Methods and systems may be used for transfer learning of neural networks. According to one example, a method includes: grouping data objects of a first training set into a plurality of clusters; training a base model using a first cluster of the plurality of clusters, the base model being a neural network having a plurality of nodes; generalizing the base model to obtain a generalized base model, the generalizing the base model including setting a portion of the plurality of nodes to have random or predetermined weights; determining that the first cluster is, out of the plurality clusters, most similar to a second training set; and training the generalized base model using the second training set to obtain a trained model.

20 Claims, 5 Drawing Sheets

Related U.S. Application Data continuation of application No. 16/295,822, filed on Mar. 7, 2019, now Pat. No. 10,565,471.

(51) Int. Cl.
  *G06F 18/24* (2023.01)
  *G06F 18/23213* (2023.01)

(56) References Cited

U.S. PATENT DOCUMENTS

| | | | |
|---|---|---|---|
| 9,336,884 B2* | 5/2016 | Jeong | H01L 29/66825 |
| 9,704,054 B1 | 7/2017 | Tappen | |
| 2003/0069652 A1 | 4/2003 | Lee | |
| 2007/0233625 A1 | 10/2007 | Tian | |
| 2008/0065471 A1 | 3/2008 | Reynolds | |
| 2009/0018940 A1 | 1/2009 | Wang et al. | |
| 2009/0112752 A1 | 4/2009 | Milana | |
| 2015/0302436 A1 | 10/2015 | Reynolds | |
| 2016/0379132 A1 | 12/2016 | Jin | |
| 2018/0033147 A1* | 2/2018 | Becker | G06V 30/262 |
| 2018/0137395 A1 | 5/2018 | Han | |
| 2018/0204111 A1* | 7/2018 | Zadeh | G06N 3/043 |
| 2018/0300465 A1 | 10/2018 | Esman | |
| 2018/0373975 A1 | 12/2018 | Yu | |
| 2019/0095805 A1 | 3/2019 | Tristan | |
| 2019/0138650 A1 | 5/2019 | Snider et al. | |
| 2019/0138891 A1* | 5/2019 | Kim | G06N 3/045 |
| 2022/0147771 A1* | 5/2022 | Bae | G06N 3/08 |

OTHER PUBLICATIONS

Jacob Gildenblat, "Pruning deep neural networks to make them fast and small", Jacob's Computer Vision and Machine Learning blog, https://jacobgil.github.io/deeplearning/pruning-deep-learning (accessed Feb. 27, 2019) (13 pages).

M. Gethsiyal Augasta et al., "Pruning algorithms of neural networks—a comparative study," Cent. Eur. J. Comp. Sci., 3 (3) • 2003, pp. 105-115 (11 pages).

Russell Reed, "Pruning Agorithms—A Study," IEE Transactions on Neural Networks, vol. 4, No. 5, Sep. 1993 (8 pages).

* cited by examiner

SYSTEMS AND METHODS FOR TRANSFER LEARNING OF NEURAL NETWORKS

CROSS-REFERENCE TO RELATED APPLICATION(S)

This patent application is a continuation of and claims the benefit of priority to U.S. Nonprovisional patent application Ser. No. 16/737,058, filed Jan. 8, 2020, which is a continuation of U.S. Nonprovisional patent application Ser. No. 16/295,822, filed on Mar. 7, 2019, the entireties of which are incorporated herein by reference.

TECHNICAL FIELD

Various embodiments of the present disclosure relate generally to systems and methods for transfer learning of machine learning models such as neural networks.

BACKGROUND

Machine learning models such as neural networks are used in many applications. In certain situations, it may be desirable to train specialized neural networks to perform specialized tasks. For example, in the application of financial market prediction, it may be desirable to train a price prediction model for each individual stock, rather than relying on a generic price prediction model that is not specifically trained for any individual stock. However, training a neural network from scratch may be slow and time-consuming. One approach is to use transfer learning.

In transfer learning, a base model trained for a first task is reused as the starting point for training of a model for a second task. Therefore, there is a need for the base model to be prepared in a way that would facilitate effective and efficient training for the second task.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

According to certain aspects of the disclosure, systems and methods are disclosed for transfer learning of neural networks.

For instance, a computer-implemented method may include: grouping data objects of a first training set into a plurality of clusters; training a base model using a first cluster of the plurality of clusters, the base model being a neural network having a plurality of nodes; generalizing the base model to obtain a generalized base model, the generalizing the base model including setting a portion of the plurality of nodes to have random or predetermined weights; determining that the first cluster is, out of the plurality clusters, most similar to a second training set; and training the generalized base model using the second training set to obtain a trained model.

Furthermore, a computer system may include: a memory storing instructions; and one or more processors configured to execute the instructions to perform operations. The operations may include: grouping data objects of a first training set into a plurality of clusters; training a plurality of base models respectively using the plurality of clusters, each of the plurality of base models being a neural network having a plurality of nodes; generalizing each of the plurality of base models to obtain a plurality of generalized base models, the generalizing including setting a portion of the respective plurality of nodes to have random or predetermined weights; selecting, from among the plurality of generalized base models, a generalized base model to be trained using a second training set, based on data objects of the second training set; and training the selected generalized base model using the second training set to obtain a trained model.

Furthermore, a computer system may include: a memory storing instructions; and one or more processors configured to execute the instructions to perform operations. The operations may include: grouping data of a first training set into a plurality of clusters, each of the plurality of clusters including multiple types of data having a common characteristic with one another; training a base model using a cluster among the plurality of clusters, the base model being a neural network having a plurality of nodes; generalizing the base model to obtain a generalized base model, the generalizing including setting a portion of the plurality of nodes to have random or predetermined weights; determining that the cluster is, out of the plurality clusters, most similar to a second training set, the second training set having a fewer number of types of data than a number of types of data in the cluster; and training the generalized base model using the second training set to obtain a trained model.

Furthermore, in some aspects, a non-transitory computer-readable medium stores instructions that, when executed by one or more processors, cause the one or more processors to perform the aforementioned computer-implemented method or the operations that the aforementioned computer systems are configured to perform.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Various embodiments of the present disclosure relate to computer systems and computer-implemented methods for transfer learning of neural networks.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

In the following description, embodiments will be described with reference to the accompanying drawings. As will be discussed in more detailed below, in various exemplary embodiments, data within a general training set may be organized into clusters. Then, respective base models may be trained using the clusters, and the base models may be generalized. Then, an optimal generalized base model is selected as the starting point for training of a specialized model using for a specialized training set. Accordingly, effective and efficient transfer learning in training a specialized model may be realized.

Figure 1:
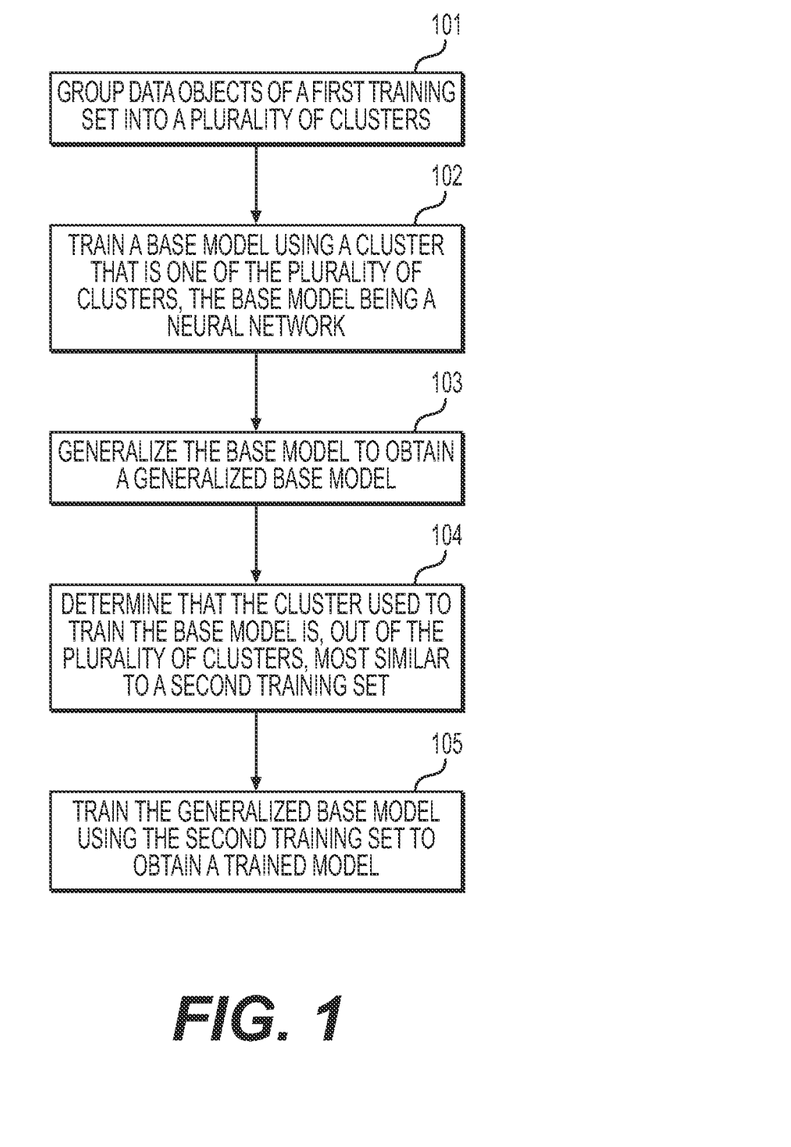
FIG. 1 is a flowchart illustrating a computer-implemented method for applying transfer learning, according to one or more embodiments of the present disclosure.

FIG. 1 is a flowchart illustrating a computer-implemented method for applying transfer learning, according to one or more embodiments of the present disclosure. The method may be performed by a computer system, which may include a memory storing instructions and one or more processors configured to execute the instructions to perform the method.

A first training set may be obtained by the computer system. For example, the first training set may be received by the computer system from an external source (such as a device connected to the computer system over a network), input into the computer system by a user, or generated by the computer system from other data.

In step 101, the computer system may group data objects of the first training set into a plurality of clusters. Data objects may be interchangeably referred to as data samples or data points and may each include a feature vector comprising a plurality of features. In this disclosure, a "feature" may include a combination of an attribute and a value of the attribute. An attribute may, for example, be a parameter, a variable, or a type of data. A common attribute may be specified in a plurality of data objects of the first training set. The plurality of data objects of the first training set may have different respective values for that common attribute.

In various embodiments, the first training set may have a wide variety of types of data objects. The first training set may be, for example, a general training set. To construct a base model for transfer learning that facilities efficient training of a specialized model that is to be trained using a smaller variety of types of data objects, the data objects of the first training set may be grouped into a plurality of clusters such that similar data objects are grouped together.

The data objects of the first training set may be grouped into clusters by any suitable method. In some embodiments, the grouping may be based on values of one or more attributes in the data of the first training set. The one or more attributes used for cluster formation may be any combination of discrete or continuous variables, and may be a subset of the entire set of attributes of a data object. Based on the values of the attributes, data objects in the first training set may be grouped so that data objects of similar or the same characteristics, as represented by the values of the attributes, are grouped together.

In some embodiments, some or all of the attributes used for cluster formation may correspond to characteristic(s) of a desired output. In this context, a desired output may be any output or plurality of outputs of a neural network (e.g., a base model, generalized based model, and/or trained model as described below) that is trained based on the data objects. Examples of characteristics of the desired output include the type of output (e.g., whether the output is classification or regression) of one or more output nodes of the output layer, the type of model used for generation (e.g., whether the model is a generative adversarial networks (GANs) or a recurrent neural network (RNN)), the size of the output layer, and the variable whose value is to be specified by one or more output nodes of the output layer. For example, each of the data objects may have a respective feature defining a respective value for an attribute corresponding to output type. This value may indicate whether the desired output is classification (e.g., the output is a value for a continuous variable) or regression (e.g., the output is a value for a categorical variable). In some circumstances, the use of attributes that correspond to characteristics of the desired output may be beneficial for clustering, because if the desired output is significantly different between different data objects (e.g., some data objects are used for classification while others are used for regression), the transfer learning may need modification to the base model.

The grouping of the data objects into clusters may utilize a clustering algorithm, such as a hierarchical clustering algorithm, a centroid-based clustering algorithm (e.g., k-means), a density-based clustering algorithm (e.g., DBSCAN and mean-shift), a distribution-based clustering algorithm (e.g., expectation-maximization), a k-nearest neighbors algorithm, and/or any other suitable algorithm, or combinations thereof. That is, the grouping of the data objects into clusters may be unsupervised.

In some embodiments, the clusters may be formed based on one or more user-defined features of the data objects. For example, the attributes used for cluster formation may include attributes corresponding to characteristic(s) of a desired output, as described above, and such attributes may have user-specified values. Attributes used for cluster formation may, additionally or alternatively, include attributes having values specified by a user based on the user's characterization of the data object. In embodiments in which the clusters are formed based on one or more user-defined features, the values of the attributes used for cluster formation may be specified by a user in a manner that may affect clustering or be determinative of the cluster into which a data object is included.

The plurality of clusters produced in step 101 may, in some embodiments, each be "hard" clusters in that each data object in the first training set is included in no more than one of the plurality of clusters. However, it is also possible for data objects to be included in more than one cluster. For example, it is possible for data objects at the boundary of two clusters to be included in both clusters. That is, at least some of the clusters may overlap. In some embodiments, the plurality of clusters may include every data object in the training set. Alternatively, the process of grouping data objects into clusters may omit certain data objects from any of the clusters.

In step 102, the computer system may train a base model using a cluster that is one of the plurality of clusters obtained in step 101. The base model may be a neural network. The neural network may have one or more hidden layers of nodes, in addition to the input layer of nodes, and the output layer of nodes. The number of hidden layers may depend on the particular implementation of the method, and may be, for example, 2 or more, 5 or more, 10 or more, 25 or more, 50 or more, 100 or more, etc. The number of nodes within each layer, and the number of total nodes in the neural network may depend on the particular implementation of the method. For example, the number of total nodes in the one or more hidden layers may be 5 or more, 10 or more, 50 or more, 100 or more, 500 or more, etc. The number of nodes in the input and output layers may depend on the input variables and desired output of the particular implementation. The neural network may have any suitable architecture. For example, the neural network may be a convolution neural network (CNN) or a recurrent neural network (RNN). In various embodiments, the neural network may be a deep neural network, such as a deep CNN or a deep RNN. For example, the one or more hidden layers may have a certain number of hidden layers such that the neural network is considered to be "deep." The neural network may be referred to as an artificial neural network.

In the neural network, each node of each layer before the output layer may have a connection to each node of the next layer, and may have a respective weight for each of the connections to the nodes of the next layer. For example, if a first hidden layer includes nodes $a_1$, $a_2$, $a_3$, $a_4$, and $a_5$, and the next layer includes nodes $b_1$, $b_2$, $b_3$, and $b_4$, then the node $a_1$ may have weights $w_{a1b1}$, $w_{a1b2}$, $w_{a1b3}$, and $w_{a1b4}$, respectively corresponding to its connections to nodes $b_1$, $b_2$, $b_3$, and $b_4$. Likewise, the node $a_2$ may have weights $w_{a2b1}$, $w_{a2b2}$, $w_{a2b3}$, and $w_{a2b4}$, respectively corresponding to its connections to nodes $b_1$, $b_2$, $b_3$, and $b_4$.

The weights of a node may be used as a multiplier to the output of the node for purposes of input into the following node. In the example discussed above, the outputs of the first hidden layer nodes $a_1$, $a_2$, $a_3$, $a_4$, and $a_5$ into node $b_1$ may be respectively multiplied by weights $w_{a1b1}$, $w_{a2b1}$, $w_{a3b1}$, $w_{a4b1}$, and $w_{a5b1}$, to obtain weighted outputs. The weighted output may be used as an input parameter for a function that determines or affects the output of node $b_1$. For example, the weighted outputs may be summed, and the sum may be input into an activation function of the node $b_1$. The activation function of the node $b_1$, as well as any other node, may be any suitable function, such as a sigmoidal function, a logistic function, a hyperbolic tangent function, or a rectified linear unit function, etc.

While certain characteristics of the neural network have been discussed above for purposes of illustration, it is understood that the neural network to which methodologies of this disclosure may be applied may have any characteristic of neural networks now known or later developed.

In step 103, the computer system generalizes the base model to obtain a generalized base model. The generalized base model may have a lesser degree of fitting as compared to the pre-generalized base model of step 102. For example, compared to the pre-generalized base model, the generalized base model may be less overfitting and/or more underfitting to the cluster used for training in step 102. Step 103 may be performed by setting a portion of the plurality of nodes to have random or predetermined weights based on a determination of a lack of significance of the portion of the plurality of nodes to the performance (e.g., accuracy) of the base model. For example, the portion of the plurality of nodes may be set to have random or predetermined weights upon determining that removal of the nodes does not substantially affect the accuracy of the base model. A random or predetermined weight may be set for each output connection or at least one output connection of each node of the portion of the plurality of nodes.

A predetermined weight may be, for example, zero or a weight that is initially used for the node when training the base models. The predetermined weight, in general, may be of a value specified prior to step 103, and may be the same or different across the nodes whose weights are set in step 103.

According to some examples, step 103 may be performed by pruning the base model to remove one or more nodes of the plurality of nodes from the base model; restoring, to the base model, the one or more nodes removed in the pruning; and setting the one or more nodes restored in the restoring to have random or predetermined weights. Additional exemplary aspects of step 103 are provided in the discussion of FIG. 2 below.

In step 104, the computer system may determine that the cluster used to train the base model is, out of the plurality of clusters obtained in step 101, most similar to a second training set. The second training set may be a specialized training set used to train the generalized base model. Prior to step 104, the second training set may be received by the computer system from an external source (such as a device connected to the computer system over a network), input by a user, or generated by the computer system from other data. It is noted that while step 104 is shown to be subsequent to step 103 in FIG. 1, step 104 may instead take place in a different time, such as between step 101 and step 102. Additionally, "most similar" may be interchangeable with "most representative" where context permits.

To perform step 104, the computer system may calculate a measure of similarity between the data objects of the second training set and the data objects of the each of the plurality of clusters. This measure of similarity may be based on values of one or more attributes defined in both the second training set and the plurality of clusters. The one or more attributes used for assessment of similarity may be the same as or different from the one or more attributes used for cluster formation of step 101.

The measure of similarity may be a similarity score representing a closeness between values of the attributes used for assessment of similarity in the data objects of the second training set and values of the same attributes in data objects of a respective cluster. For example, the score may be a distance between the respective means of the two sets of values. This similarity score may be calculated for each of the plurality of clusters, and the cluster with the closest similarity score is determined as the cluster that is most similar to the second training set.

By determining that the cluster used to train the base model (and, by extension, the generalized model) is the cluster that is most similar to the second training set, the generalized base model that has been trained from that cluster (or to be trained from that cluster, if step 103 occurs after step 104) may be selected to facilitate training under the second training set. The generalized base model may be used as the starting point for training using the second training set, so that a trained model that is trained to the second training set may be developed efficiently.

In step 105, the generalized base model may be trained using the second training set to obtain a trained model. That is, the generalized base model may be retrained to the second training set, so as to become, for example, a trained specialized model when the second training set is a specialized training set. Since the generalized base model is used as the starting point for training using the second training set, the training of the trained model can be performed more efficiently, and the accuracy of the trained model may be greater, than in the case in which the trained model were instead retrained from the base model or a model trained to the entire general training set. The generalization of the base model may avoid overhead that may otherwise be incurred in unlearning and retraining weights in the pre-generalized base model that may add unnecessary bias.

While a single base model is mentioned in FIG. 1, the method of FIG. 1 may involve a plurality of base models and a plurality of generalized models. That is, step 102 may train a plurality of base models, each respectively trained from one of the plurality of clusters, and step 103 may generalize each of the plurality of base models. Accordingly, the cluster that is determined in step 104 to be most similar to the second training set may be part of a process of selecting a generalized base model from among the plurality of generalized base models, and step 105 may be performed by training using the selected generalized base model.

The training of the base models using the clusters and the training of the generalized base model using the second training set may be performed using any training method that is suitable for training neural networks.

The base model, generalized base model, and trained model each may be configured to produce an output as a function of input data, wherein the function has a functional relationship (e.g., mapping between the input and output) learned by the respective training process. The output may include one or more labels predicted by the model to characterize the input data. The set of possible values for the label may be continuous or discrete, and may be the same among each of the base model, generalized base model, and the trained model. In some embodiments, the value of the label may indicate a classification of a subject represented by the input data.

The method illustrated by FIG. 1 may be part of a larger process that further includes a step of using the trained model trained in step 105. The step of using the trained model may include receiving input data comprising one or more data objects, and inputting the one or more data objects into the trained model to thereby obtain one or more labels respectively output for the one or more data objects of the input data.

Figure 2:
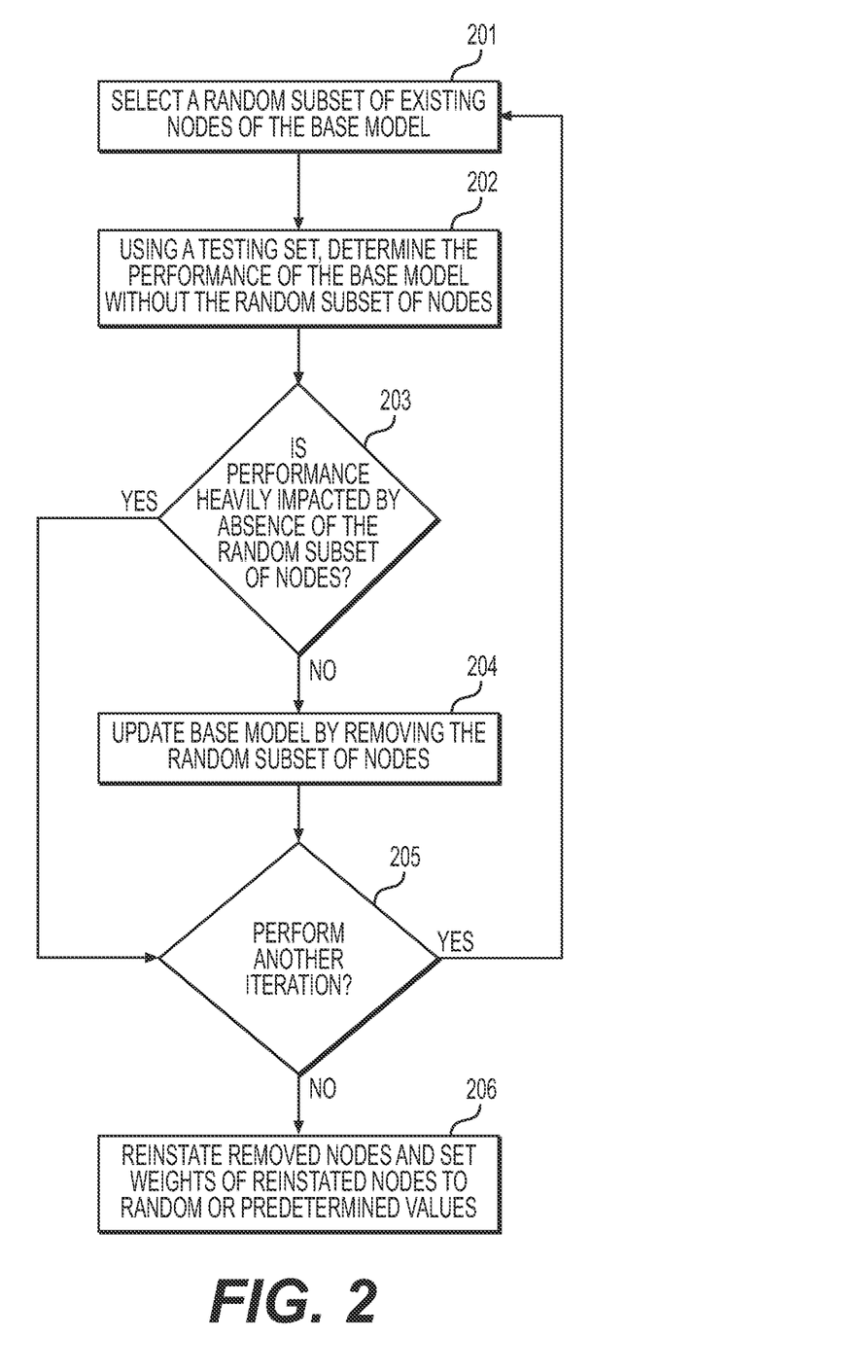
FIG. 2 illustrates an example of a process for generalizing the base model to obtain a generalized base model, according to one or more embodiments of the present disclosure.

FIG. 2 illustrates an example of a process for generalizing the base model to obtain a generalized base model. That is, the process of FIG. 2 is an example of step 103 of FIG. 1, and the individual steps illustrated in FIG. 2 may each be a sub-step of step 103 of FIG. 1. Among the steps shown in FIG. 2, steps 201-205 may be referred to as a pruning process. Additionally, steps 201-204 may be an repeatable process that is performed a plurality of iterations.

In step 201, the computer system may select a random subset of existing nodes of the base model. The random subset may comprise one or more nodes that are randomly selected from a base set of nodes of the base model. The base set of nodes may be, for example, all existing nodes within the input layer and hidden layers of the base model, or all existing nodes within the hidden layers. In this context, "existing" may refer to nodes that have not been removed in the subsequent step 203 in a previous iteration of the repeatable process. The number of nodes in the random subset of nodes may be, in general, a predetermined number, and may be set based on the size (e.g., the total number of nodes) of the neural network.

In step 202, the computer system may determine, using a testing set, the performance of the base model without the random subset of nodes. In this step, the base model may be tested in a state in which the selected random subset of nodes are temporarily removed, or play no role in determining the output of the base model. For example, each output of each node within the random subset of nodes may be disregarded. The testing set may be any set of data objects suitable to evaluate the performance of the base model, such as a set that is representative of the cluster used to train the base model. Performance may be a measured indicator of a performance metric. An example of a performance metric is a percentage accuracy in outputting a correct label for data objects of the testing set.

In step 203, the computer system may determine whether performance is heavily impacted by the absence of the random subset of nodes. This step may be performed by evaluating the performance measured in step 202 based on one or more criteria. Such criteria may specify a sufficiency condition, such as an acceptable range of performance. For example, the performance measured in step 202 may be compared with a performance threshold that is set based on a performance standard, such as the performance (e.g., accuracy) of the base model prior to step 103 of FIG. 1 or a predetermined performance measure. For example, if the performance measured in step 202 is lower than the performance threshold (e.g., 10% lower than the performance of the base model prior to step 103 of FIG. 1), then the computer system may determine that performance is heavily impacted by the absence of the random subset of nodes (step 203: YES). Otherwise, if the performance measured in step 202 is not lower than the performance threshold (e.g., is equal to or exceeds the performance threshold), then the computer system may determine that performance is not heavily impacted by the absence of the random subset of nodes (step 203: NO).

If the result of step 203 is "NO," then the process proceeds to step 204, in which the computer system updates the base model by removing the random subset of nodes. Thus, if there is a subsequent iteration of the repeatable process of steps 201-204, the random subset of nodes may be treated as not being part of the base set of nodes from which another random subset of nodes is selected. If the result of step 203 is "YES," then the process skips step 204 and proceeds to step 205.

In step 205, the computer system determines whether another iteration of the repeatable process of steps 201-204 is to be performed. The computer system may be determined if a condition for termination of the repeatable process is satisfied. For example, the repeatable process of steps 201-

204 may be reiterated until a predetermined number of iterations has been executed, or until step 203 results in a "YES" result.

In step 206, the computer system may reinstate the nodes removed in the pruning process, and set the weights of the reinstated nodes to random or predetermined values. In this step, the nodes removed in the pruning process may be restored to their original layers. If a restored node has multiple outputs, such as a plurality of outputs respectively corresponding to a plurality of nodes in a next layer, the restored node may be given random or predetermined weights for each of its outputs.

Accordingly, the process of FIG. 2 produces a generalized model that has been generalized from the base model. In the process of FIG. 2, steps 201 through 205 identify nodes whose weights, as trained in step 102, may result in inefficient training during training using the second training set in step 105. For example, these weights may have been trained to over-fit the training cluster used in step 102, or trained for specific characteristics of the training cluster that may not be relevant to training using the second training set. Therefore, by setting the weights to random or predetermined values, the base model may be generalized for transfer learning, so as to avoid overhead that may otherwise be incurred in unlearning and retraining weights of base model 331 that may otherwise add unnecessary bias.

Additionally, according to step 206, the nodes identified in steps 201 through 205 are not completely eliminated from the neural network, but are instead set to have random or predetermined weights. Therefore, the process of FIG. 2 may transform the base model into a generalized model that is more readily adaptable to the second training set, without reduction of the size of the node tree.

Figure 3:
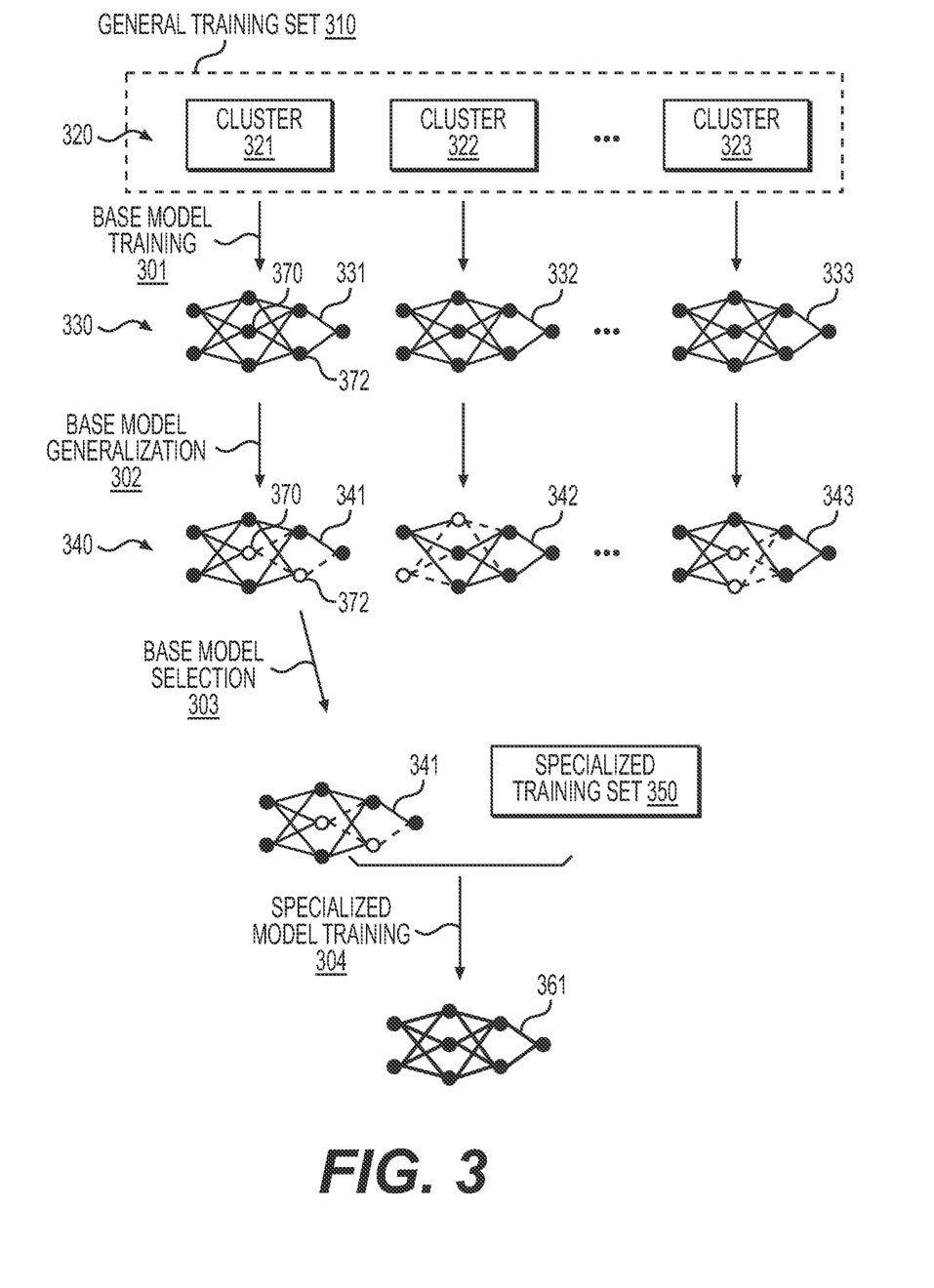
FIG. 3 illustrates an example of applying the method of FIG. 1 to train a specialized model using a base model derived from a general training set, according to one or more embodiments of the present disclosure.

FIG. 3 illustrates an example of applying the method of FIG. 1 to train a specialized model using a base model derived from a generalized training set along with additional aspects that may be implemented in the method. In FIG. 3, data objects of a general training set 310 (which is an example of the first training set of FIG. 1) are grouped into a plurality of clusters 320 examples of which include clusters 321, 322 and 323. The grouping of the data objects into clusters 320 may be performed in accordance with step 101 of FIG. 1.

In step 301 (base model training), each of the plurality of clusters 320 is used to train a respective base model, so as to result in a plurality of base models 330. For example, base models 331, 332, and 333 are respectively trained using the data objects of clusters 321, 322, and 323. The training of any of the base models 331, 332, and 333 may be performed in accordance with step 102 of the method of FIG. 1. As shown in FIG. 3, the base models may each be a neural network. In the figure, the neural networks constituting the base models 331, 332, and 333 are shown in a simple representation for purposes of illustration only. That is, it is understood that the neural networks may include more than the 8 nodes depicted in FIG. 3. The neural networks in FIG. 3 may each be a deep neural network.

In step 302 (base model generalization), the plurality of base models 330 are generalized into a plurality of generalized base models 340. For example, generalized base models 341, 342, and 343 are generalized from base models 331, 332, and 333, respectively. Step 302 may be performed in accordance with step 103 of FIG. 1.

The generalization may include, for each of the plurality of base models, setting a portion of the plurality of nodes of the respective base model to have random or predetermined weights. The nodes that are set to random or predetermined weights may be nodes that have been determined to be unimportant to the accuracy of the base model, based on a certain methodology, such as the methodology of FIG. 2.

In FIG. 3, nodes whose weights have been set to random or predetermined values are indicated by an open circle. For example, base model 331 includes, from left to right, an input layer of two nodes, a first hidden layer of three nodes, a second hidden layer of two nodes, and an output layer of one node. Node 370 in the first hidden layer of base model 331 may be determined to be unimportant to the accuracy to the base model 331. Accordingly, the weight of its output to the first node in the second hidden layer and the weight of its output to the second node in the second hidden layer may each be set to a random value or to a predetermined value such as zero. Similarly node 372 in the second hidden layer of base model 331 may also be determined to be unimportant to the accuracy to the base model 331. Accordingly, the weight of its output to the output node may each be set to a random value or to a predetermined value such as zero. Weights that are set to a random or predetermined value are indicated in FIG. 3 in broken lines.

In step 303 (base model selection), one of the generalized base models 340 (e.g., generalized model 341) is selected for further training using a specialized training set 350. This selected generalized base model may be understood as an optimal model for transfer learning. Specialized training set 350 is an example of the second training set of step 104 of FIG. 1, and the selection of the generalized base model to be trained using the specialized training set may be performed in accordance with step 104 of FIG. 1.

For example, the selection process may include determining that, out of the plurality clusters 320, cluster 321 is most similar to the specialized training set 350, so as to result in the selection of the generalized base model 341, which was trained based on cluster 321, for training using the specialized training set 350. This determining process may include determining a first similarity score representing a degree of similarity between specialized training set 350 and cluster 321, a second similarity score representing a degree of similarity between specialized training set 350 and cluster 322, and a third similarity score representing a degree of similarity between specialized training set 350 and cluster 323 (and additional similarity scores for other clusters, if any). If the first similarity score is the greatest, then, upon determining that the first similarity score is the greatest, cluster 321 is selected as the cluster that is most similar. Upon selection of cluster 321, the corresponding generalized base model 341 that was trained using cluster 321 is selected for further training using the specialized training set 350. It is noted that step 303, while illustrated in FIG. 1 to take place after step 302, may occur prior to step 301. That is, it is possible to select the cluster first, and then generate base model 331 and generalized base model 340.

In step 304, generalized base model 341 is used for further training using specialized training set 350. Accordingly, by using the generalized base model 341 as a starting point, a trained model 361 that is trained to the specialized training set 350, is produced. Since the generalized model 314 has been trained from the cluster 321 that is most similar to the specialized training set, and has been further generalized, the training of the trained model 361 can be performed more efficiently than if the trained model 361 were instead retrained from a base model 331 or a model trained to the entire general training set 310.

Figure 4:
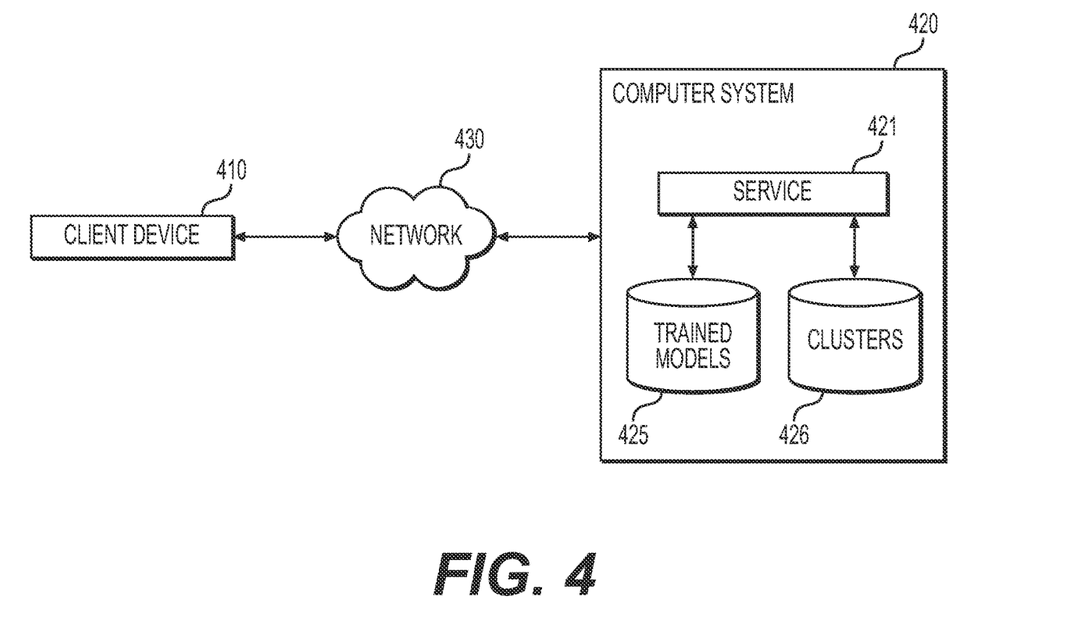
FIG. 4 depicts an example of an environment in which the processes shown in FIGS. 1-3 may be implemented, according to one or more embodiments of the present disclosure.

FIG. 4 depicts an example of an environment in which the processes shown in FIGS. 1-3 may be implemented. The environment includes a computer system 420, a network 430, and a client device 410 communicatively connected to the computer system 420 through the network 430. The network 430 may be a public network (e.g., the internet), a private network (e.g., a network within an organization), or a combination of public and private networks. The client device 410 may be one or more computing devices.

The computer system 420 may perform any of the processes and steps shown in FIGS. 1-3 and discussed above. For example, the computer system 420 may receive the first training set (e.g., general training set 310) over the network 430 from client device 410, and group the data objects of the first training set into a plurality of clusters 320. The computer system 420 may store the plurality of clusters 320 in a data store 426 and/or output the clusters 320 over the network 430 to client device 410. Additionally, the computer system 420 may receive the second training set (e.g., specialized training set 350) over the network 430 from client device 410, and generate a trained model (e.g., trained model 361) based on the stored clusters. The computer system 420 may store the trained model in a data store 425 and/or output the trained model to client device 410. Data stores 425 and 426 may be the same data store or different data stores, and may be part of the memory of the computer system 420. Additionally, the memory of the computer system 420 may store generalized base models (e.g., generalized base models 340).

Additionally, the computer system 420 may be configured to use any of the trained models by inputting input data into any of the trained models to obtain an output from the trained model. The input may be received from the client device 410 over the network 430. The output from the trained model may be transmitted to the client device 410 over the network 430.

In some embodiments, the computer system 420 may be a server that provides a service 421 implementing any one or more of the above functionalities. The computer system 420 may, for example, be a cloud computing system with scalable/elastic resources for performing computer-implemented processes and/or storage of data.

In some embodiments, the service 421 may be a neural network generation service. For example, client device 410 may submit a request for a trained model to the computer system 420, along with the first training set and/or the second training set. The service 421 may be an application that processes the request, and transmits the trained model to the client device 410 and/or another device connected to the network 430. In doing so, the service 421 may use the clusters stored in data store 426 and data provided by the client device 410 to generate the trained model.

For example, the client device 420 may provide the second training set to the service 421 along with a request for a trained model. In order to generate the trained model in response to the request, the service 421 may compare the second training set provided by the client device 420 with the clusters stored in the data store 426 using the methodologies discussed in this disclosure. If generalized base models have already been generated from the clusters and stored in the computer system 420, the service 421 may select the generalized base model corresponding to the cluster most similar to the second training set received from the client device 420, and then train the selected generalized base model using the second training set. Upon completing the training, the service 421 may transmit the trained model to the client device 420.

Additionally or alternatively, the service 421 may be a data analysis service. For example, client device 410 may submit a request to the computer system 420 to perform data analysis using a trained model, along with input data that is to be analyzed. The service 421 may process the request by selecting a trained model suitable for the task requested by the client device 410, inputting the data into the selected trained model to obtain an output from the selected trained model, and sending the output to the network device 410 and/or another device connected to the network 430.

It is noted that the client device 410 is intended to serve an example of a device connected to the computer system 420. The client device 410 may, in general, be a computing device that transmits any of the aforementioned data to the computer system 420.

The processes shown in FIGS. 1-3 and the computer system 420 shown in FIG. 4 may be used in a variety of applications involving machine learning models, without limitation to any specific application. A few applications are discussed below.

One example application is the training of a neural network used for the prediction of financial markets. For example, the first training set may be a general training set that includes data objects representing information pertaining to a broad range of stocks. Each data object may be given a label describing an event (e.g., stock price movement) associated with the information. Based on such information, a neural network may be trained to predict a correct label (e.g., stock price movement) when given input data.

When the data objects of the general training set are grouped into clusters, each cluster may represent information pertaining to stocks that have similar characteristics. To apply transfer learning to train a model that specializes in predicting stock prices for a specific stock, a specialized training set (as the second training set) containing data objects representing events of that specific stock may be input into the computer system 420. The computer system 420 may compare the specialized training set with each of the clusters to determine that one of the clusters is most similar to the specialized training set. Then, the computer system selects a generalized base model, wherein the generalized base model has been generalized from a base model having been trained using the cluster most similar to the specialized training set.

The selected generalized base model is then trained using the specialized training set to obtain a trained model. The computer system 420 may furthermore configure the service 421 to use the trained model to analyze input data received from the client device 410 and return outputs of the trained model to the client device 410. In this case, the output may be stock price movement predicted by the trained model based on the input data.

Another example application is the training of a neural network used for detecting fraudulent transactions of financial assets, such as insider trading of stocks. For example, the first training set may be a general training set that includes data objects representing stock market transactions across a broad range of stocks. Each data object may include information pertaining to a stock market transaction, such as information describing the type of transaction (such as buy, sell, short sale, or short covering, etc.), the timing of the event, and information describing characteristics of the stock involved in the transaction (such as the sector or industry to which the company issuing the stock belong, market capitalization of the stock, etc.). For example, insider trading may be more likely to occur for stocks of certain types of companies. Each data object also may include additional information relevant to fraud, such as information describing events relevant to stock prices (such as the release of information to the public) and the timing the event. For example, purchase of stock shares immediately prior to the release of an unexpectedly positive earnings report may be indicative of insider trading. Each type of information may be an attribute of the data object.

The general training set may be grouped into clusters such that each cluster includes data objects corresponding to stocks having similar characteristics. Base models and generalized base models may be respectively generated for the clusters. The base models and generalized base models may be trained to label a transaction, as represented by a data object, as being either fraudulent or non-fraudulent. However, there may be a desire to train a model to specialize in detecting fraudulent behavior for a specific stock, especially when a stock-specific training set (as the second training set) containing data objects that represent transactions of a specific stock, is available.

To apply transfer learning, the stock-specific training set may be input to computer system 420, which then determines the cluster that is most similar to the stock-specific training set and selects the generalized base model corresponding to that most-similar cluster as the starting point for training using the stock-specific training set. Then, the computer system 420 may train the selected generalized base model using the stock-specific training set to obtain a trained model specialized in detecting fraudulent activity pertaining to the specific stock. The computer system 420 may furthermore configure the service 421 to use the trained model to analyze inputs received from the client device 410 and return outputs (e.g., outputs indicating a classification of fraudulent or non-fraudulent) of the trained model to the client device 410.

Another example application is the training of a neural network used for detection of fraudulent activity in the usage of financial accounts. For example, the first training set may be a general training set that includes data objects representing activities across different types of financial accounts. For example, a credit card account and a debit card may be considered to be two different types of financial accounts. Additionally, within the general category of credit cards, for example, the data objects may include activities pertaining to multiple types of credit cards (e.g., rewards program credit cards, frequent flier credit cards, personal credit cards, corporate credit cards, etc.), and different specific credit card programs within a general type of credit card. Data objects may include additional information pertinent to fraud detection, such as the parties involved with the activity (e.g., the vendor from which a purchase was made), and the location of the activity. Data objects may be given a label as to whether the activity is fraudulent or non-fraudulent.

When the data objects of the general training set are grouped into clusters, each cluster may include data objects pertaining to financial accounts having similar characteristics. For example, one cluster may principally include data objects representing purchases using corporate credit cards, while another cluster may principally include data objects representing purchases using debit cards. Base models and generalized base models may be respectively generated for the clusters. These base models and generalized base models may be trained to label an activity, as represented by a data object, as being either fraudulent or non-fraudulent. However, there may be a desire to train a model to specialize in detecting fraudulent behavior for a specific class of financial account, such as a credit card accounts belonging to a specific type of credit card or a specific credit card program. The specialized model may be trained using a specialized training set containing data objects representing activities for that type of financial account.

To apply transfer learning, the specialized training set may be input into computer system 420, which then may determine the cluster that is most similar to the stock-specific training set and select the generalized base model corresponding to that most-similar cluster as the starting point for training using the specialized training set. The computer system 420 may train the selected generalized base model using the specialized training set to obtain a trained model specialized in detecting fraudulent activity pertaining to the specific class of financial account by classifying whether the activity is fraudulent or non-fraudulent. The computer system 420 may furthermore configure the service 421 to use the trained model to analyze inputs received from the client device 410 and return outputs (e.g., outputs indicating a classification of fraudulent or non-fraudulent) of the trained model to the client device 410.

Another example application is the training of a neural network used for the analysis or classification of media-related data, such as image data or audio data. For example, the first training set may be a general training set that includes data objects representing a broad range of images pertaining to many subjects. The characteristic of the images may be represented as features (including an attribute and a value) of the feature vector of the data objects. Additionally, each data object may be given a label. The label may be a classification that is among a set of classifications.

When the data objects of the general training set are grouped into clusters, each cluster may include data objects representing images having similar characteristics. For example, each cluster may correspond to images depicting related subject matters. For example, if the data objects of the general training set each represent an image of an animal, the clusters may ultimately correspond to the types of animal or animal anatomy depicted in the images.

To apply transfer learning to train a model to specialize in images of a particular subject matter using a specialized training set containing data objects representing images of that particular subject matter, the computer system 420 may compare the specialized training set with each of the clusters to determine that one of the clusters is most similar to the specialized training set. Then, the computer system selects a generalized base model having been generalized from a base model trained using the cluster most similar to the specialized training set. The selected generalized base model is then trained using the specialized training set to obtain a trained model. The computer system 420 may furthermore configure the service 421 to use the trained model to analyze inputs received from the client device 410 and return outputs of the trained model to the client device 410.

According to the methodologies discussed above, efficient transfer learning in training a specialized model may be facilitated by selection of a base model, for transfer learning purposes, that has been trained from the most-suitable cluster and subsequently generalized in a way that promotes efficient retraining.

In general, any process discussed in this disclosure that is understood to be computer-implementable, such as the processes shown in FIGS. 1-3, may be performed by one or more processors of a computer system, such as computer system 420 as described above. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or another type of processing unit.

A computer system may include one or more computing devices. If the one or more processors of the computer system is implemented as a plurality of processors, the plurality of processors may be included in a single computing device or distributed among a plurality of computing devices. If a computer system comprises a plurality of computing devices, the memory of the computer system may include the respective memory of each computing device of the plurality of computing devices.

Figure 5:
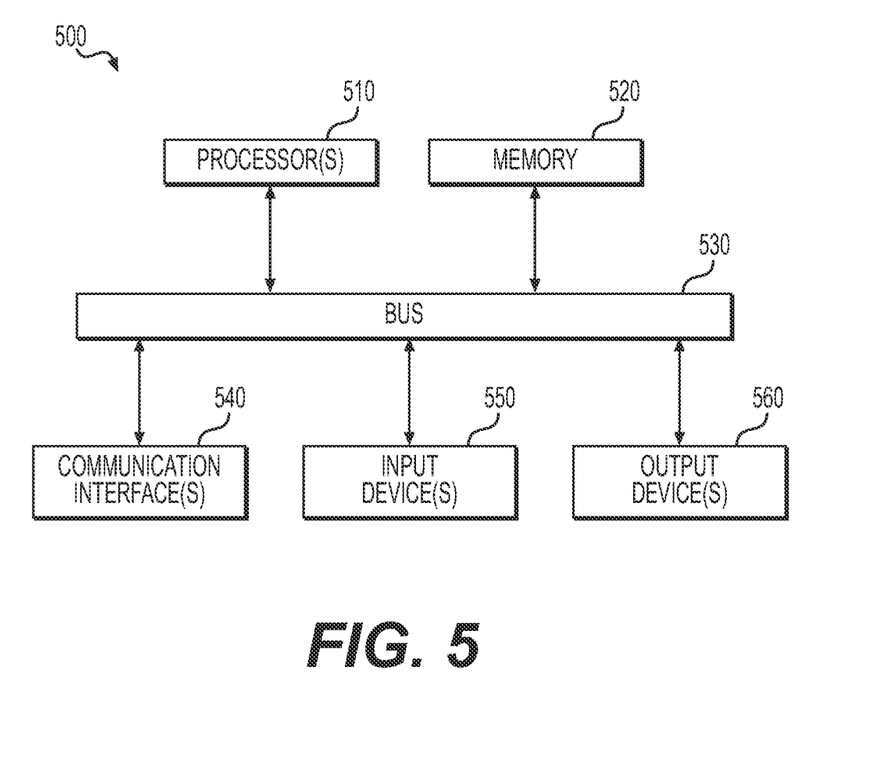
FIG. 5 illustrates an example of a computing device of a computer system, according to one or more embodiments of the present disclosure.

FIG. 5 illustrates an example of a computing device 500 of a computer system. The computing device 500 may include processor(s) 510 (e.g., CPU, GPU, or other processing unit), a memory 520, and communication interface(s) 540 (e.g., a network interface) to communicate with other devices. Memory 520 may include volatile memory, such as RAM, and/or non-volatile memory, such as ROM and storage media. Examples of storage media include solid-state storage media (e.g., solid state drives, removable flash memory), optical storage media (e.g., optical discs), and/or magnetic storage media (e.g., hard disk drives). The aforementioned instructions (e.g., software or computer-readable code) may be stored in any volatile and/or non-volatile memory component of memory 520. The computing device 500 may, in some embodiments, further include input device(s) 550 (e.g., a keyboard, mouse, or touchscreen) and output device(s) 560 (e.g., a display, or a printer). The aforementioned elements of the computing device 500 may be connected to one another through a bus 530, which represents one or more busses.

In some embodiments, the processor(s) 510 of the computing device 500 includes both a CPU and a GPU, wherein the GPU may be used for machine learning computations (e.g., computations in the training of models). The GPU may be a general-purpose GPU.

Instructions executable by one or more processors may be stored on a non-transitory computer-readable medium. Therefore, whenever a computer-implemented method is described in this disclosure, this disclosure shall also be understood as describing a non-transitory computer-readable medium storing instructions that, when executed by one or more processors, cause the one or more processors to perform the computer-implemented method. Examples of non-transitory computer-readable medium include RAM, ROM, solid-state storage media (e.g., solid state drives), optical storage media (e.g., optical discs), and magnetic storage media (e.g., hard disk drives). A non-transitory computer-readable medium may be part of the memory of a computer system or separate from any computer system.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted.

What is claimed is:

1. A computer-implemented method for training a specialized neural network, comprising:
   receiving a first training set;
   determining that the first training set is most similar to a first base cluster in a plurality of base clusters that group data objects included in a second training set, wherein:
      determining that the first base cluster is most similar to the first training set includes, for each cluster of the plurality of base clusters, computing a distance value representing a degree of similarity between values of one or more attributes in data objects of the cluster and values of the one or more attributes in data objects of the first training set; and
      computing the distance value representing the degree of similarity includes calculating a distance between a mean value of the one or more attributes in data objects of the cluster and a mean value of the one or more attributes in data objects of the first training set;
   identifying a generalized base model trained using the first base cluster, wherein the generalized base model trained using the first base cluster is identified from a plurality of trained generalized base models that were trained using different base clusters; and
   training the identified generalized base model using the first training set to obtain the specialized neural network.

2. The method of claim 1, wherein the determining that the first base cluster is most similar to the first training set further includes:
   selecting a cluster, from the plurality of base clusters, with a highest degree of similarity between the mean value of the one or more attributes in data objects of the cluster and the mean value of the one or more attributes in data objects of the first training set.

3. The method of claim 1, wherein the second training set has a higher number of types of data objects than a number of types of data objects in the base cluster.

4. The method of claim 1, wherein
the data objects of the first training set and data objects of the second training set are labeled with respective classifications that belong to a set of classifications,
the plurality of trained generalized base models are trained to output a classification selected from the set of classifications, and
training the identified generalized base model to obtain the trained model, the trained model includes training the identified generalized base model to output a classification selected from the set of classifications.

5. The method of claim 1, wherein the plurality of trained generalized based models were formed from a plurality of base models via one or more iterations of pruning the base models to remove one or more nodes of a plurality of nodes from the plurality of base models.

6. The method of claim 5, wherein the one or more iterations is a predetermined number of iterations.

7. The method of claim 5, wherein the plurality of base models are deep neural networks including a plurality of hidden layers of nodes, and the pruning removes one or more nodes from at least one of the plurality of hidden layers.

8. The method of claim 1, wherein the second training set includes data objects representing a plurality of images pertaining to a plurality of subjects, and the first training set includes data objects representing images associated with one of the plurality of subjects.

9. The method of claim 1, wherein the second training set includes data objects representing information pertaining to a plurality of stocks, and the first training set includes data objects representing events or transactions associated with one stock of the plurality of stocks.

10. The method of claim 1, wherein the second training set includes data objects representing activities across a plurality of different types of financial accounts, and the first training set includes data objects representing activities associated with one or more of the different types of financial accounts.

11. A computer-implemented method for training a specialized neural network, comprising:
receiving a first training set;
determining that the first training set is most similar to a first base cluster in a plurality of base clusters that group data objects included in a second training set, wherein:
the second training set has a higher number of types of data objects than a number of types of data objects in the first base cluster; and
determining that the first base cluster is most similar to the first training set includes:
for each cluster of the plurality of base clusters, computing a distance value representing a degree of similarity between values of one or more attributes in data objects of the cluster and values of the one or more attributes in data objects of the first training set by calculating a distance between a mean value of the one or more attributes in data objects of the cluster and a mean value of the one or more attributes in data objects of the first training set;

identifying a generalized base model trained using the first base cluster, wherein the generalized base model trained using the first base cluster is identified from a plurality of trained generalized base models that were trained using different base clusters; and
training the identified generalized base model using the first training set to obtain the specialized neural network.

12. The method of claim 11, wherein the determining that the first base cluster is most similar to the first training set further includes:
selecting a cluster, from the plurality of base clusters, with a highest degree of similarity between the mean value of the one or more attributes in data objects of the cluster and the mean value of the one or more attributes in data objects of the first training set.

13. The method of claim 11, wherein:
the data objects of the first training set and data objects of the second training set are labeled with respective classifications that belong to a set of classifications;
the plurality of trained generalized base models are trained to output a classification selected from the set of classifications; and
training the identified generalized base model to obtain the trained model, the trained model includes training the identified generalized base model to output a classification selected from the set of classifications.

14. The method of claim 11, wherein the plurality of trained generalized based models were formed from a plurality of base models via one or more iterations of pruning the base models to remove one or more nodes of a plurality of nodes from the plurality of base models.

15. The method of claim 14, wherein the one or more iterations is a predetermined number of iterations.

16. The method of claim 14, wherein the plurality of base models are deep neural networks including a plurality of hidden layers of nodes, and the pruning removes one or more nodes from at least one of the plurality of hidden layers.

17. The method of claim 11, wherein the second training set includes data objects representing information pertaining to a plurality of stocks, and the first training set includes data objects represents events or transactions associated with one stock of the plurality of stocks.

18. The method of claim 11, wherein the second training set includes data objects representing a plurality of images pertaining to a plurality of subjects, and the first training set includes data objects representing images associated with one of the plurality of subjects.

19. The method of claim 11, wherein the second training set includes data objects representing activities across a plurality of different types of financial accounts, and the first training set includes data objects representing activities associated with one or more of the different types of financial accounts.

20. A computer system for training a specialized neural network, comprising:
a memory storing instructions; and
one or more processors configured to execute the instructions to perform operations including:
receiving a first training set;
determining that the first training set is most similar to a first base cluster in a plurality of base clusters that group data objects included in a second training set, wherein:
determining that the first base cluster is most similar to the first training set includes, for each cluster of the plurality of base clusters, computing a distance value representing a degree of similarity between values of one or more attributes in data objects of the cluster and values of the one or more attributes in data objects of the first training set; and computing the distance value representing the degree of similarity includes calculating a distance between a mean value of the one or more attributes in data objects of the cluster and a mean value of the one or more attributes in data objects of the first training set;

identifying a generalized base model trained using the first base cluster, wherein the generalized base model trained using the first base cluster is identified from a plurality of trained generalized base models that were trained using different base clusters; and training the identified generalized base model using the first training set to obtain the specialized neural network.

\* \* \* \* \*